United States Patent
Cartwright

(10) Patent No.: US 6,846,055 B2
(45) Date of Patent: Jan. 25, 2005

(54) THERMAL PRINTHEAD OPERATION

(75) Inventor: Kevin Roy Cartwright, Great Barr (GB)

(73) Assignee: Avery Berkel Limited, West Midlands (GB)

( * ) Notice: Subject to any disclaimer, the term of this patent is extended or adjusted under 35 U.S.C. 154(b) by 0 days.

(21) Appl. No.: 10/203,393

(22) PCT Filed: Feb. 8, 2001

(86) PCT No.: PCT/GB01/00483

§ 371 (c)(1),
(2), (4) Date: Nov. 18, 2002

(87) PCT Pub. No.: WO01/58693

PCT Pub. Date: Aug. 16, 2001

(65) Prior Publication Data

US 2003/0122884 A1 Jul. 3, 2003

(30) Foreign Application Priority Data

Feb. 8, 2000 (GB) .............................. 0002710

(51) Int. Cl.⁷ ............................................... B41J 29/38
(52) U.S. Cl. ....................................................... 347/14
(58) Field of Search ............................ 347/191, 5, 14, 347/19, 60–62, 56, 188, 206, 171, 211; 400/120.11

(56) References Cited

U.S. PATENT DOCUMENTS

| | | | | |
|---|---|---|---|---|
| 4,284,876 A | * | 8/1981 | Ishibashi et al. ............ 347/195 |
| 4,595,935 A | * | 6/1986 | Brooks et al. .............. 347/171 |
| 4,769,657 A | | 9/1988 | Takahashi | |
| 5,248,993 A | * | 9/1993 | Oshino et al. .............. 347/211 |
| 5,675,370 A | | 10/1997 | Austin et al. | |
| 6,036,297 A | * | 3/2000 | Hayasaki ..................... 347/13 |
| 6,188,423 B1 | * | 2/2001 | Pou ............................ 347/211 |

FOREIGN PATENT DOCUMENTS

| | | |
|---|---|---|
| EP | 0 902 385 A2 | 3/1999 |
| JP | 57137162 | 8/1982 |
| JP | 59136264 | 8/1984 |

* cited by examiner

Primary Examiner—K. Feggins
Assistant Examiner—An H. Do
(74) Attorney, Agent, or Firm—Kirschstein, et al.

(57) ABSTRACT

A method of operating a thermal printhead includes the steps of periodically determining a current value proportional to the resistance of printhead elements; providing a warning signal when the current value of any element exceeds a predetermined multiplier of the nominal value; and then modifying the operation of the printhead so that such element is energized only for the printing of a barcode within the printed area. An apparatus, especially a weighing apparatus, for carrying out such a method is also disclosed.

8 Claims, 4 Drawing Sheets

12JUN99

£/kg     £/kg     £

123.45   12.345   946.85

THERMAL PRINTHEAD OPERATION

Thermal printers arc used extensively in situations such as the retail trade, for printing product labels, for example.

The labels may have printed on them such things as textual information, logos and product bar codes as a series of dots.

A thermal printer is a type of printer in which the image is produced by localized heating of paper that has a very thin thermosensitive coating containing two separate and colourless components, a colour former and a dyestuff. The heating is by elements or "dots" typically arranged in a row in a printhead. When heated the colour former melts and combines with the previously colourless dyestuff to make a visible mark.

The aim of the present invention is to provide automatic indication of imminent printhead dot failure on a thermal printhead. In addition, the period in which the printhead is able to produce "scannable" bar codes will be extended by selective use of printhead dots once wear has been indentified.

By way of example only, weighing machines often employ thermal printheads in order to print label or receipt information. The textual information is usually important, however, should some dots fail to print, under normal circumstances that information will still be legible, However, scanning of barcodes, when barcodes are printed in line with the printhead 'dots' generally will not tolerate any dot failures, especially when the scanners deployed to scan the barcodes arc of a hand-held technology.

It is frequently difficult and inconvenient to change a printhead or to take a weighing machine out of service immediately. Also a situation which would require recalibration using the actual resistances of the elements of a printhead at installation of a replacement printhead raises problems due to users changing faulty print heads and such calibration has been found to be unnecessary.

Consequently it is preferable not to rely on calibrated values and to avoid the necessity of changing a print head for as long as possible.

The object of the present invention is to attempt to provide automatic identification of imminent element failure and to extend the ability to print the most critical trading information (i.e. the barcodes). This will reduce significantly the number of mis-scans, which will increase the throughput of retail checkouts and reduce public frustration when performing barcode self-scans.

According to the present invention there is provided:— a method of operating a thermal printhead comprising the steps of:—

(a) periodically determining a current value proportional to the resistance of each element within the thermal printhead;

(b) providing a warning signal when the current value proportional to the resistance of one or more elements exceeds a predetermined multiplier of the nominal value of the resistance of that element:

(c) In response to said warning signal modifying the operation of the printhead whereby an element or elements whose current value proportional to the resistance thereof exceeds a predetermined multiplier of the nominal value of the resistance of that element is energised only for the printing of a barcode.

There is further provided apparatus for operating a thermal printhead, comprising switching means for entering a self-test routine during a period of inactivity of the printhead and sequentially determining current values proportional to the current resistance of each element, a comparator for comparing a stored nominal value for each element and the current value for each element and control means providing a warning signal when the current value for that element exceeds a predetermined multiplier of the nominal value for that element and for controlling the energising of an element or elements to occur only when printing barcodes when the current value for an element has exceeded a predetermined multiplier of the nominal value for that element.

The present invention will now be described, by way of example, with reference to the accompanying drawings, in which:—

Figure 1:
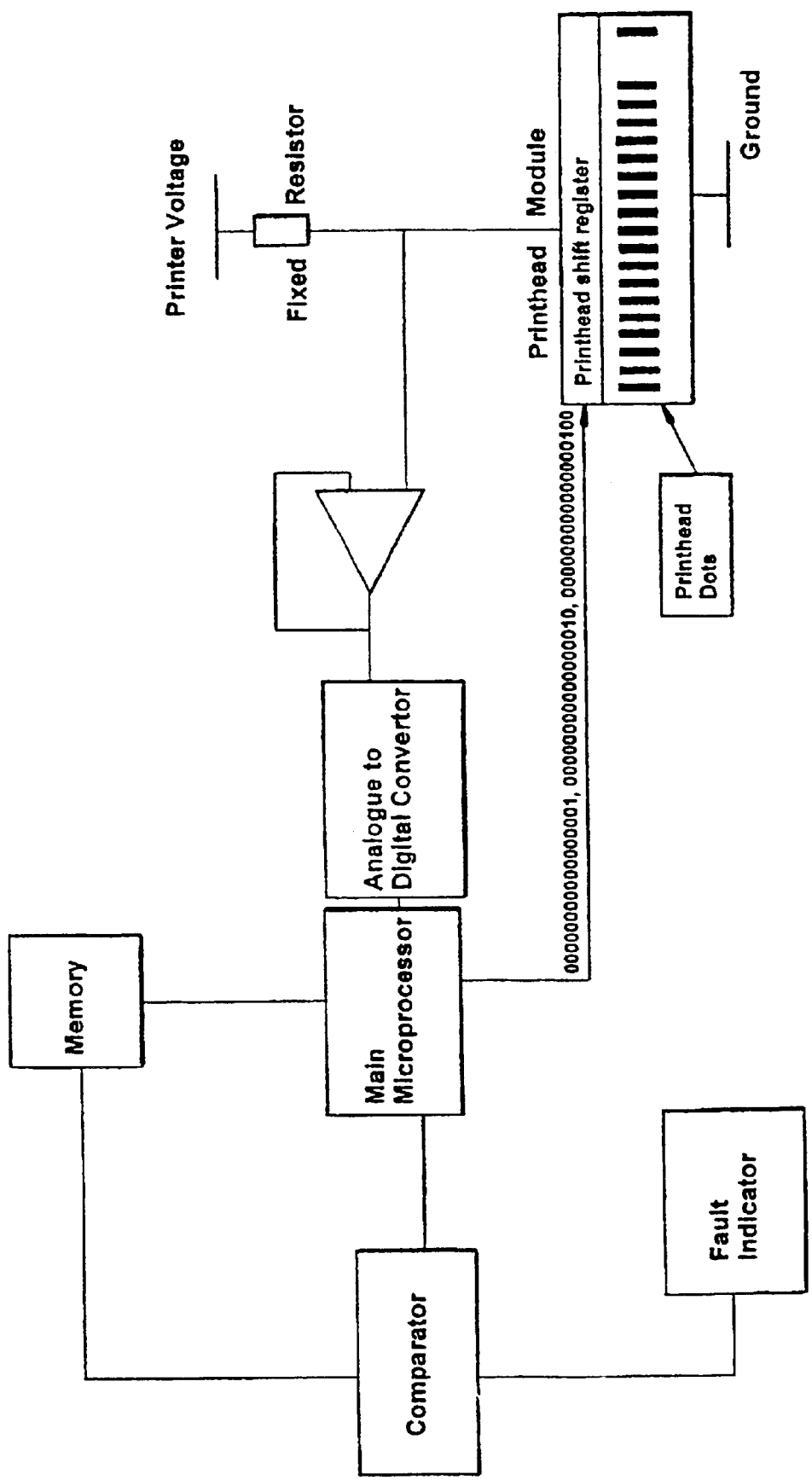
FIG. 1 shows a block schematic of an apparatus in accordance with the present invention.
Figure 2:
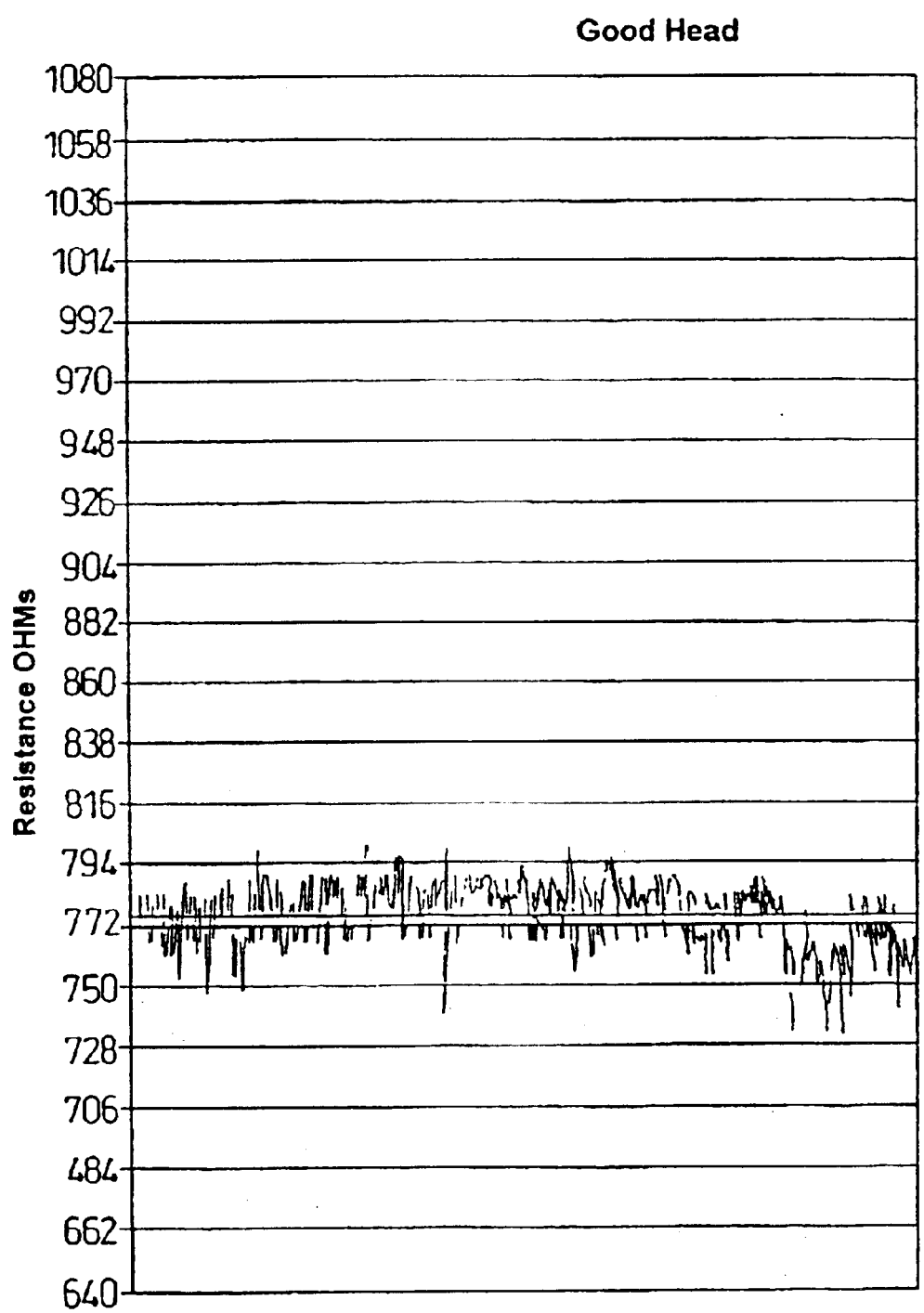
FIG. 2 shows a typical graph of the element resistances of a new printhead.

A printhead provides a series of dots forming a dot line. As shown in FIG. 1, using a fixed resistor as a reference, a potential divider is formed by this and the individual dots. The potential difference measured by the A-to-D circuitry is approximately proportional to the dot resistance.

During periods of inactivity, the weighing equipment will automatically enter a user transparent self-test routine. The resistance of each element will be measured in turn and compared with the nominal printhead value. Any dot which is outside its resistance specification will be deemed as "imminently about to fail". This will result in a warning signal being generated and provided to any or all of the following:

(a) the user (via weighing equipment display);

(b) a rear-of-store computer (c) a head office computer.

Figure 3:
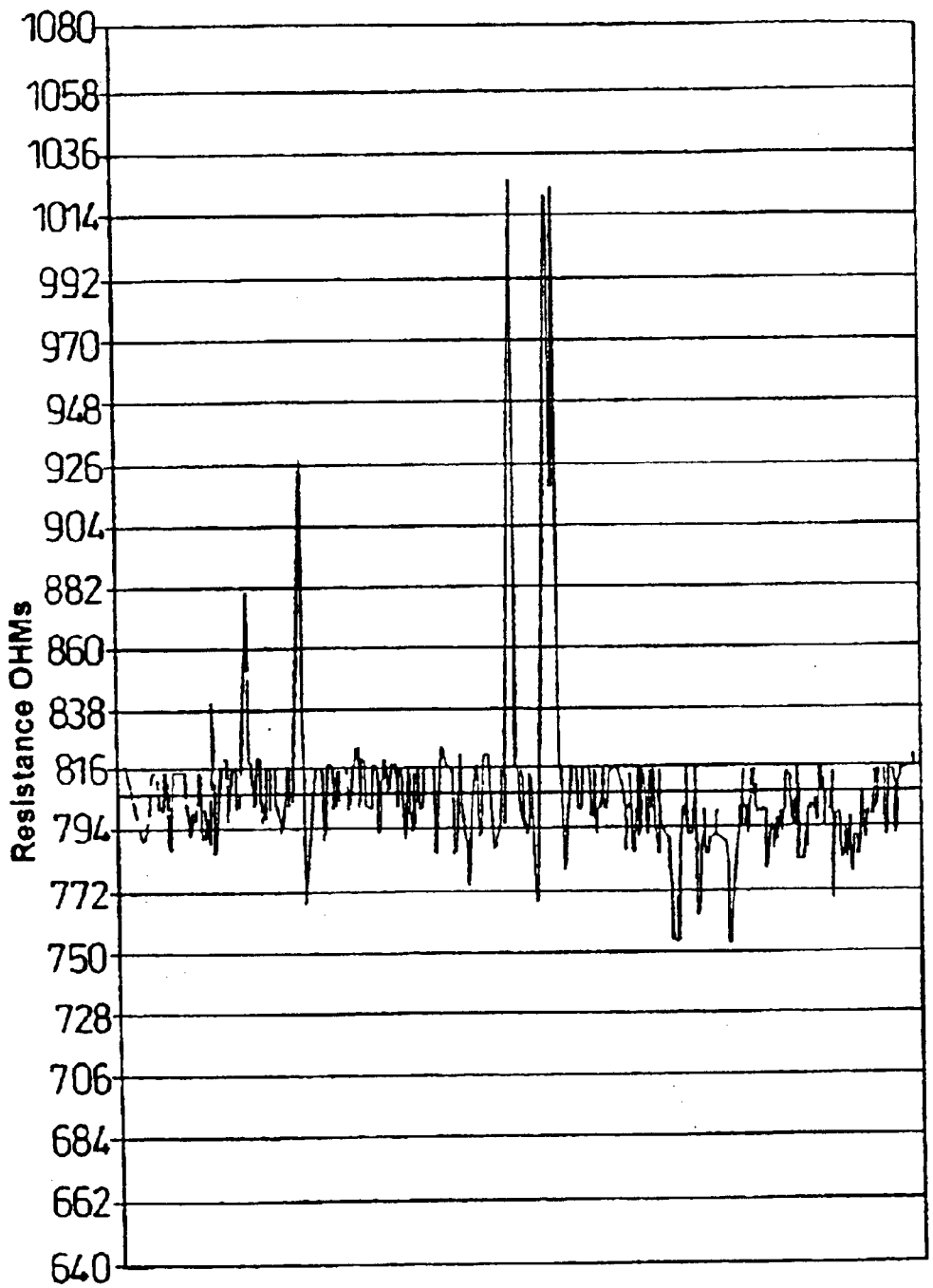
FIG. 3 shows a typical graph of the element resistances in a printhead where for a number the elements the resistance has increased to the point where failure is likely to be imminent.
Figure 4:
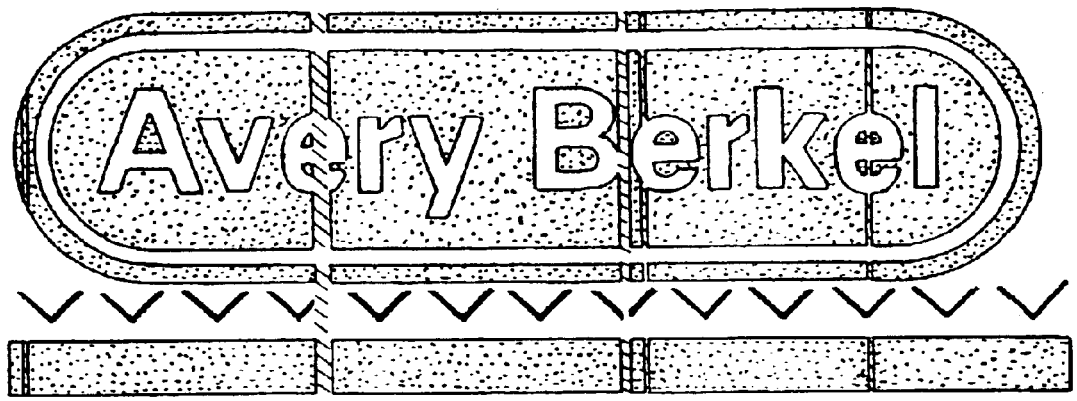
FIG. 4 shows a typical lable when printhead dot wear exists and printing is occuring in the barcode area and not in the other areas.
Figure 4:

During normal operation of the equipment, at pre-defined regular periods, the printhead element resistances will be measured and compared with the nominal printhead values by the comparator. The example shown in FIG. 3 demonstrates that some dots have now changed resistance by a significant amount. If this variation is now approaching the manufacturer's defined limit then the equipment will indicate that the printhead needs to be replaced. Manufacturers typically quote 10% to 15% as being the level at which there is a significant risk of failure.

The comparator will then provide a signal to a fault indicator, which may be located at the printer, or at a rear-of-store or head-office computer, for example.

What is claimed is:

1. A method of operating a thermal printhead for printing barcodes and other data, the printhead having elements with respective resistances, the method comprising the steps of:

a) periodically determining a current value proportional to the resistance of each element within the thermal printhead;

b) providing a warning signal when the current value proportional to the resistance of at least one element exceeds a predetermined multiplier of a nominal value of the resistance of said at least one element; and c) in response to said warning signal, modifying the operation of the thermal printhead such that said at least one element whose current value proportional to the resistance thereof exceeds the predetermined multiplier of the nominal value of the resistance of said at least one element is energized only for printing of a barcode.

2. The method of operating the thermal printhead as claimed in claim 1, wherein the step of determining the current value proportional to the resistance of each element is performed during periods of non-use of the thermal printhead.

3. The method of operating the thermal printhead as claimed in claim 1, wherein the step of determining the current value of each element is performed by sequentially applying a voltage across a fixed resistor in series with each element to form a potential divider, and by measuring a potential difference across the element.

4. The method of operating the thermal printhead as claimed in claim 3, wherein the step of sequentially applying the voltage to each element is performed by sending a pattern to a shift register connected to the thermal printhead.

5. The method of operating the thermal printhead as claimed in claim 1, wherein the predetermined multiplier is 110% or 115%.

6. An apparatus for operating a thermal printhead for printing barcodes and other data, the printhead having elements with respective resistances, comprising:
   a) switching means for entering a self-test routine during a period of inactivity of the thermal printhead;
   b) measuring means for sequentially determining initial and current values proportional to the resistance of each element;
   c) a comparator for comparing a stored nominal value for each element and the current value for each element; and
   d) control means for providing a warning signal when the current value for that element exceeds a predetermined multiplier of the stored nominal value for that element, and for controlling the energizing of at least one element to occur only when printing barcodes when the current value for said at least one element has exceeded the predetermined multiplier of the stored nominal value for said at least one element.

7. The apparatus as claimed in claim 6, wherein said measuring means comprises a voltage source for applying a voltage across a fixed resistor sequentially connected in series with each element to form a potential divider, and means for measuring a potential difference across each element.

8. A weighing arrangement including an apparatus for operating a thermal printhead for printing barcodes and other data, the printhead having elements with respective resistances, comprising:
   a) switching means for entering a self-test routine during a period of inactivity of the thermal printhead;
   b) measuring means for sequentially determining initial and current values proportional to the resistance of each element;
   c) a comparator for comparing a stored nominal value for each element and the current value for each element; and
   d) control means for providing a warning signal when the current value for that element exceeds a predetermined multiplier of the stored nominal value for that element, and for controlling the energizing of at least one element to occur only when printing barcodes when the current value for said at least one element has exceeded the predetermined multiplier of the stored nominal value for said at least one element.

* * * * *